July 26, 1927.
J. W. KUHN
1,637,195
TIRE BUILDING MACHINE
Filed April 13, 1926
3 Sheets-Sheet 1
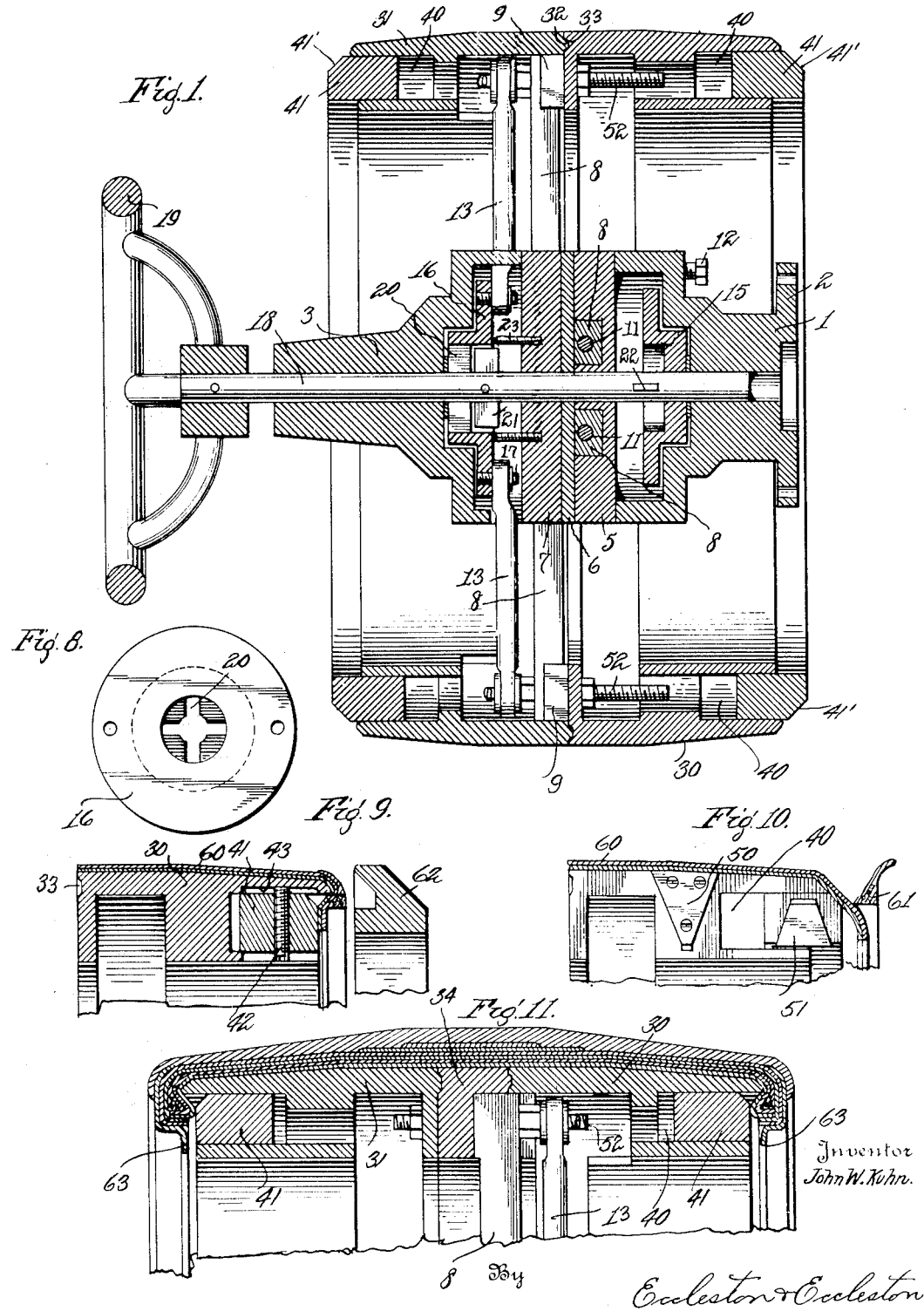
Inventor
John W. Kuhn.
By
Eccleston & Eccleston,
Attorneys July 26, 1927.
J. W. KUHN
1,637,195
TIRE BUILDING MACHINE
Filed April 13, 1926
3 Sheets-Sheet 2
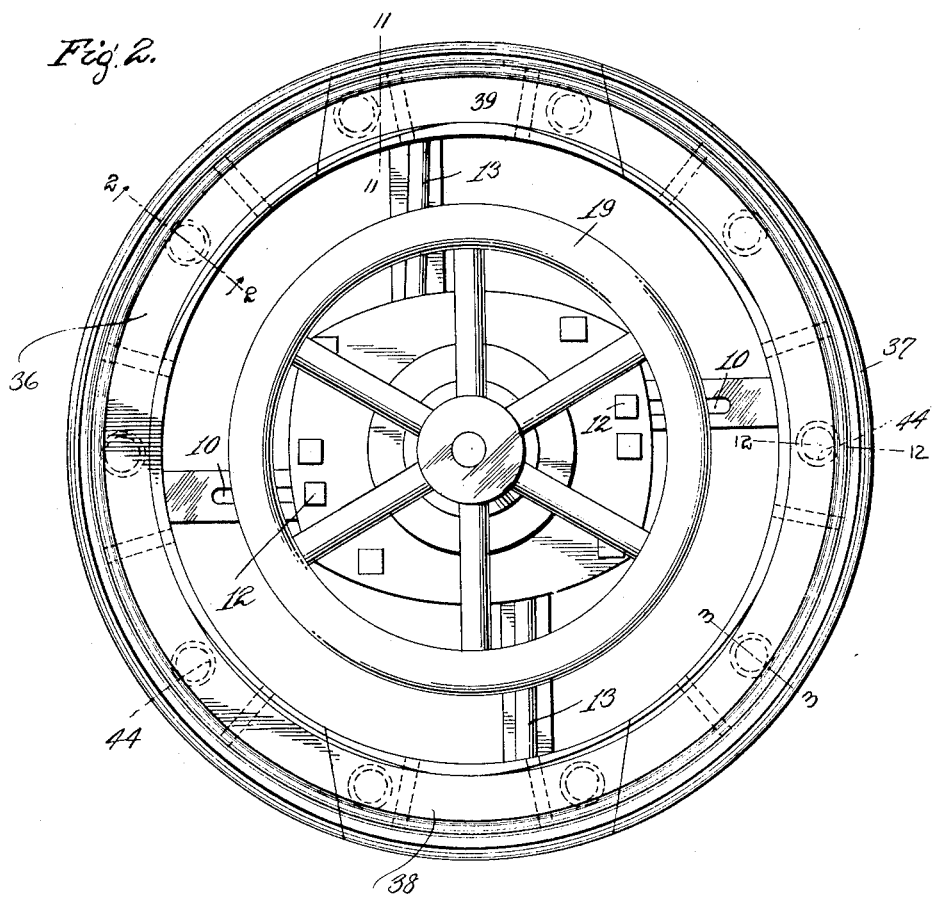
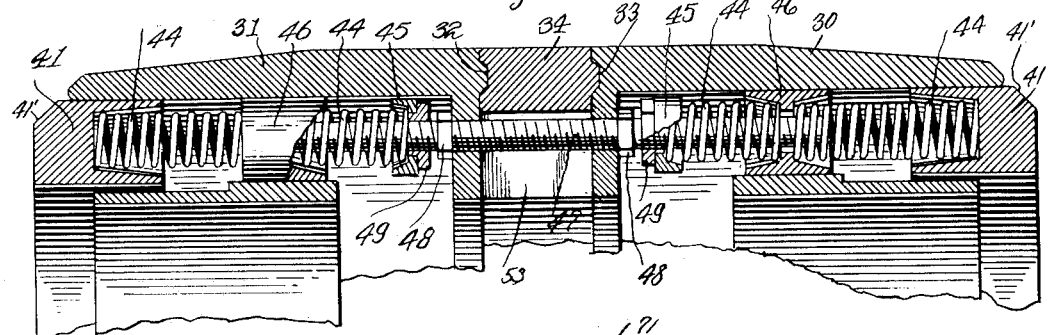
Inventor
John W. Kuhn.
By Eccleston & Eccleston,
Attorneys July 26, 1927.  
J. W. KUHN  
TIRE BUILDING MACHINE  
Filed April 13, 1926
1,637,195
3 Sheets-Sheet 3
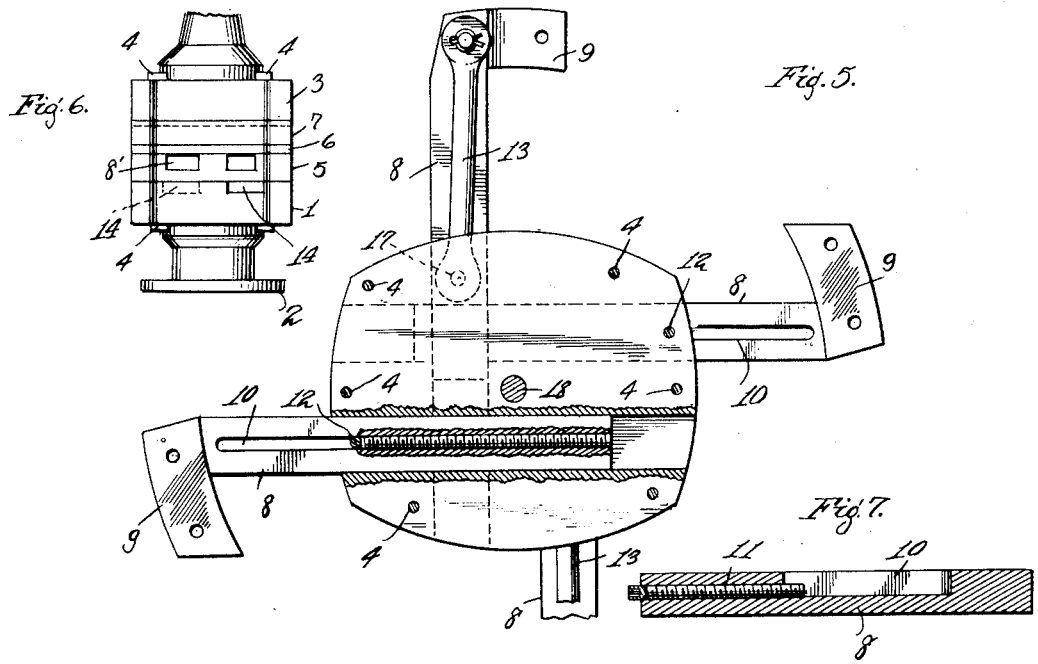
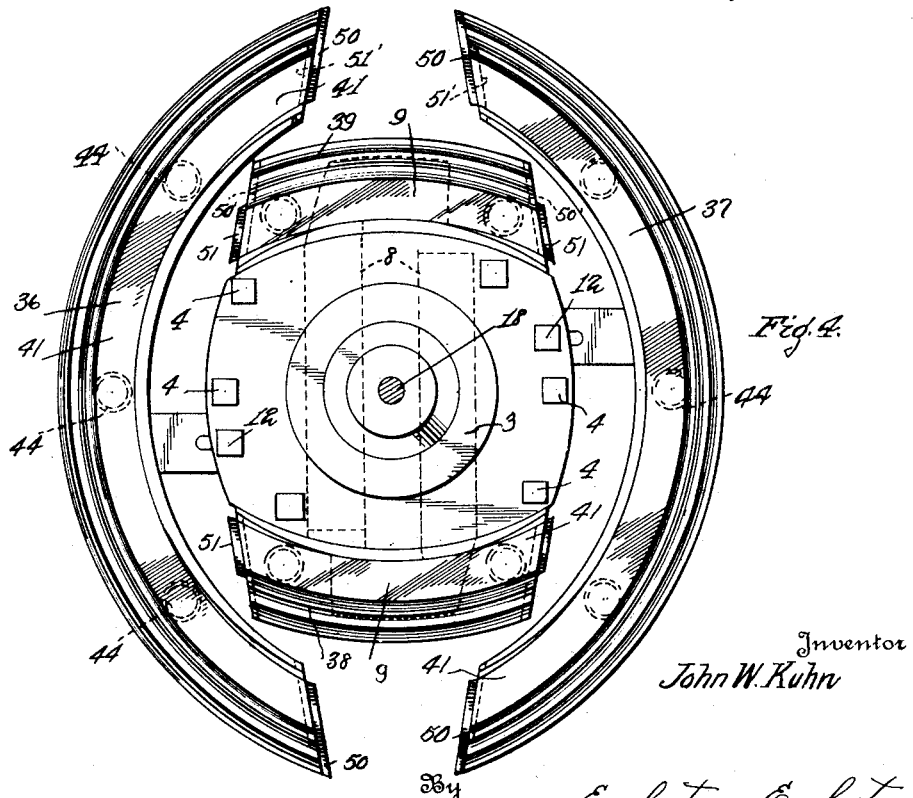
Inventor  
John W. Kuhn  
By Eccleston & Eccleston  
Attorneys Patented July 26, 1927.

1,637,195

UNITED STATES PATENT OFFICE.

JOHN W. KUHN, OF AKRON, OHIO.

TIRE-BUILDING MACHINE.

Application filed April 13, 1926. Serial No. 101,758.

The present invention relates to a machine for the manufacture or building up of tire blanks in flat condition and which may then be shaped into tire casings or shoes for pneumatic tires. The invention is more especially intended for use in connection with the building of straight side tires in which a wire or metal reinforcing bead is employed, but is equally well adapted to the construction of tires of the clincher type.

The present invention may be employed in the construction of fabric, cord and balloon tires of either the straight side or clincher type, and has for its object to provide a band wheel on which the tires may be built flat and subsequently shaped to the proper form, such band wheel being so constructed as to permit the building up of the tire by applying the plies of fabric, green or semi-cured rubber, breaker strips, beads, treads, etc., to the band wheel, and which will permit the tire when completed to be quickly and easily stripped from the wheel.

Another object of the invention resides in the provision of means on the band wheel for cooperation with the bead setters to allow the beads to assume the desired angle with respect to the tire body.

A further object of the invention consists in the provision of novel means for collapsing and expanding the rim of the band wheel.

Other objects and advantages of the invention will be apparent to those skilled in the art from the following description when taken in connection with the accompanying drawings, in which:

Figure 1 is a vertical section through the complete device.

Figure 2 is a side elevation thereof.

Figure 3 is a fragmentary vertical section taken on line 3—3 of Figure 2.

Figure 4 is a side elevation of the device in collapsed position.

Figure 5 is a sectional view through the hub with parts removed.

Figures 6 and 7 are detail views of the hub and spokes.

Figure 8 is a side elevation of one of the collapsing wheels.

Figures 9 and 10 are detail sectional views showing various steps of the building operation.

Figure 11 is a section taken on line 11—11 of Figure 2.

Figure 12 is a section taken on line 12—12 of Figure 2; and

Figure 13 is a sectional view showing a modification which may be employed when building clincher tires.

Referring to the drawings more in detail the numeral 1 indicates a portion of the hub of the tire building wheel which is provided with a flange 2 adapted to be bolted to the main shaft of the operating mechanism. Opposed to the hub portion 1 is a hub portion 3 which is bolted to the first-mentioned hub portion by means of bolts 4. These hub portions are slightly hollowed out on their adjacent faces as indicated in Figure 1 for the reception of certain operating parts to be later described, and clamped between the edges of these hub sections are plates 5, and 7 adapted to slidably receive spokes 8 in slots 8' thereof. The numeral 6 refers to a wear plate.

The spokes 8 are provided with heads 9 which are fixedly secured to the tire building band of the wheel to be hereinafter described in detail. Each of these spokes is formed with a longitudinally extending slot 10 in one of its side walls and in the inner end of each spoke is a machine screw 11 having its inner end located in the slot 10 and acting as one limit of the radial movement of the spokes; this being due to the fact that bolts 12 extending partly through the hub section have their inner ends located within the slots 10 to limit the inner and outer movement of these spokes as well as the rim sections carried thereby.

For the purpose of retracting and extending the spokes 8 I have pivoted to the outer ends thereof links 13 which extend through slots 14 formed in the hub sections 1 and 3 and are pivotally connected to disks 15 and 16 as indicated by numeral 17. These disks are mounted on the rod or shaft 18 which is shown in detail in Figure 1 and which is provided with an operating handle or wheel 19. Each disk 15, 16, is provided with the two diametrically opposed pivots 17 for connection with two of the links 13 and each of the disks therefor provides for the collapsing and expanding of the two diametrically opposed segments of the tire building band hereinafter described.

Each disk 15, 16, is slotted at its center portion as indicated by the numeral 20 and the shaft 18 is provided with two keys 21, 22, adapted to be received in these slots and to rotate the disks as the hand wheel 19 is rotated. As will be observed from an inspection of Figure 1 the shaft 18 is slidably mounted within the hub portions 1, 3 and the keys 21 and 22 are so disposed upon the shaft that when one of them is engaged within the slot 20 of its respective disk the other one is disengaged from its slot in the opposite disk. By this construction it will be apparent that the disks may be alternately rotated by a longitudinal movement of the shaft 18 within the hubs. Pins 23 are mounted in sections 5, 7, of the hub so as to extend outwardly from the faces thereof to aid in holding the disks 15, 16, in their proper positions.

The mechanism just described has to do particularly with the expansion and contraction of the tire building rim and it will be apparent to those skilled in the art that the screws 11 located in the spokes 8 will provide all necessary adjustments for aligning the segments of the tire building rim and that the opposed pairs of spokes 8 may be successively retracted or extended by rotation of the hand wheel 19 upon shifting of the keys 21 and 22 within their slots 20.

I will now describe the tire building band which is formed of four segments and fixed to the slidably mounted spokes 8.

The tire building rim forms the essential part of the present invention and comprises two annular sections 30 and 31 having beveled outer edges and which are provided with tongue and groove connections 32 and 33 on their inner edges. These edges may come directly together as indicated in Figure 1 (for a small tire) or they may be spaced so as to receive an expansion ring 34 as indicated in Figures 3 and 11 (for a large tire). The tire building band is formed of four segments; i. e., the two larger segments 36 and 37 and the two smaller or key segments 38 and 39. These segments are clearly indicated in several of the figures of the drawing and particularly in Figure 4 where the segments are shown in collapsed position.

Except for their size these segments of the tire building band are substantially identical and in a general way a description of one of them will serve for all. Referring especially to Figures 1, 9, 10 and 11 it will be observed that each of the sections 30, 31, is provided with an annular groove 40 in its outer face in which is slidably mounted a ring 41 having a beveled edge 41' to correspond with the bevel on the sections 30 and 31. This axial movement of the rings 41 with respect to the tire building band is limited by means of screws 42 which have their ends located in slots 43 of the band segments. Before the beads are fixed to the initial plies of the tire it is necessary that the rings 41 be at their outer positions as shown in Figures 1 and 3 and for this purpose I have provided coil springs 44 which are seated in cylindrical ports formed in the sections 30 and 31. These springs may be varied in number but in the present instance I have shown them spaced 36 degrees apart around the entire circumference of the band. These springs in each instance are shown as double to prevent breakage or undue distortion and have their outer ends seated in a pocket of the ring 41 and their inner ends seated in a cap 45. The two springs of each set are spaced apart slightly by a thimble 46 which is apertured to receive an end of the threaded bolt 47. This bolt is threaded throughout its entire length and serves to hold the two sections 30, 31, or the sections 30, 31 and their expansion ring 34 in locked position by means of nuts 48. Also threaded on the bolt 47 are nuts 49 which serve to adjust the tension of the springs 44 thereby determining the amount of pressure required to force the rings 41 to their innermost position. From a comparison of Figures 3 and 12 it will be seen that the width of the groove for receiving the ring 41 varies, being greater at its ends than at its middle portion; this being for the purpose of preventing a binding of the ring sections as they are moved inwardly and outwardly within the groove.

The ends of the segments of the rings 41 as well as the sections 30 and 31 are provided with V-shaped tongues 50 and 51 to be received in corresponding grooves 50' and 51' in the adjacent sections to lock these elements against lateral movement.

In addition to bolts 47 for connecting the sections 30, 31, are bolts 52 which form the means for securing the spokes 8 and connecting links 13 to the respective segments 36, 37, 38 and 39, and the expansion ring 34 is provided with slots 53 which will permit of its removal or replacement without entirely withdrawing bolts 47 or 52.

It is to be understood that while the foregoing description refers to expansion rings 34 annular sections 30, 31, and rings 41, these elements are all collapsible as disclosed in Figure 4 and therefore divided into segments as shown in that figure.

In the operation of the structure as thus far described, it will be assumed that the parts are as shown in Figure 3 and the tire building band expanded as shown in Figure 2. Referring now to Figure 10, the band of the wheel is provided with a coating of suitable cement and two plies of fabric 60 applied in the usual way. The beads 61 are then positioned as shown in Figure 10 and compressed into the position shown in Figure 9 by the compressors 62. This operation of course, stitches the beads to the fabric plies and the unyielding quality of the wires in the beads will cause the partly formed tire to maintain the form shown in Figure 9 after the compressors 62 are withdrawn in spite of the force of springs 44 which are of course compressed in the operation. Should the spring pressure prove too strong, however, it may be weakened by means of the adjustment 49. After the step shown in Figure 9 has been completed, the several plies which comprise the body of the tire; i. e., fabric or cord strips, breaker strips, tread, etc., are applied flat as indicated in Figure 11. The tire thus built is ready to be removed from the wheel band and the chafing strip 63 stitched around the bead. The tire in flat form is then ready to be shaped to finished form.

In collapsing the tire building band to strip the tire therefrom it is only necessary to give a partial turn to the wheel 19 twice, first when key 21 is in engagement with disk 16 and once when the key 22 is in engagement with disk 15. These partial movements of the disks 15 and 16 draw the links 13 inwardly thereby sliding the spokes 8 in their socket 8' and causing the various segments to assume the positions shown in Figure 4. The tire of course, can then be readily removed and taken to the shaper, and the rings 41 will be again moved outwardly to the position shown in Figure 3 in readiness for the next tire building operation; i. e., as soon as the band segments have been expanded by a reverse movement of the hand wheel 19.

The purpose of the axially movable rings 41 and bevel 41' are, of course, to permit the bead 61 to be applied in the exact position which it will assume in the finished tire. Obviously, if the movable sides or rings were not provided it would be impossible to set the beads properly.

A slightly modified form of the invention is shown in Figure 13, in which springpressed bolts 70 are mounted on the ring 41 and adapted for cooperation with a recess 71 in the sections 30, 31. The bolt 70 is provided with a transversely extending pin or key 72 which functions to hold the bolt in inoperative position when not required; the key being turned at right angles to the slot 73, of course, for this purpose. This lock may be used in the principal embodiment of the invention if desired and functions to hold the rings 41 in retracted position after being forced to this position by the bead setting rings or compressors 62. This is especially useful in the construction of clincher tires which do not have wire beads and which therefore would not be strong enough to hold the rings 41 against pressure of springs 44.

From the foregoing description taken in connection with the accompanying drawings it will be apparent that I have devised a relatively simple machine for building both straight side and clincher tires in flat form which provides an enormous saving in time and labor involved, increases production, etc.; and which will permit the ready removal of the tire from the tire building band.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. In a machine of the class described, a wheel including a tire building band, and a ring of lesser external diameter than said band disposed at each edge of said band and partly within its periphery.

2. In a machine of the class described, a wheel including a tire building band, and an axially movable ring of lesser external diameter than said band disposed at each edge of said band and partly within its periphery.

3. In a machine of the class described, a wheel including a tire building band having beveled edges, and a movable ring of lesser external diameter than said band disposed at each edge of said band and partly within its periphery, each ring provided with a beveled edge forming a continuation of said first-mentioned bevel edge.

4. In a machine of the class described, a wheel including a tire building band, an axially movable ring disposed at each edge of said band and means normally forcing said rings outwardly with respect to the band.

5. In a machine of the class described, a wheel including a tire building band, an axially movable ring disposed at each edge of said band and partly within its periphery, and coil springs for normally forcing said rings outwardly.

6. In a machine of the class described, a wheel including a tire building band, a pair of rings slidably mounted for axial movement on the inner periphery of said band, and a plurality of adjustable springs normally forcing said rings outwardly.

7. In a machine of the class described, a wheel including a tire building band formed of a plurality of collapsible segments, and a ring disposed at each edge of said band and partly within its periphery, said rings also formed of collapsible segments.

8. In a machine of the class described, a wheel including a tire building band formed of a plurality of collapsible segments, an axially movable ring disposed at each edge of said band, said rings being formed of a plurality of collapsible segments, and means normally forcing said rings outwardly.

9. In a machine of the class described, a wheel including a collapsible tire building band, a plurality of collapsible rings disposed adjacent the edges of said band and mounted for axial movement, means normally projecting said rings partly beyond the edges of said band, and means for collapsing and expanding said band and rings.

10. In a machine of the class described, a wheel including a tire building band, axially slidable rings disposed within said band and adjacent its edges, means normally forcing said rings outwardly, and means for automatically locking said rings against outward movement.

11. In a machine of the class described, a wheel including a tire building band, axially slidable rings disposed within said band and adjacent its edges, means normally forcing said rings outwardly, means for automatically locking said rings against outward movement, and means for rendering said locking means inoperative.

12. In a tire building machine including a band composed of two pairs of opposed segments, means for collapsing and expanding said pairs of segments successively, said means including two rotatable disks, and a clutch mechanism for engaging said disks successively.

13. In a tire building machine including a band composed of two pairs of opposed segments, means for collapsing and expanding said pairs of segments successively, said means including two rotatable disks, a shaft slidable through said disks and means on said shaft for alternately engaging said disks.

14. In a tire building machine including a band composed of two pairs of opposed segments, means for collapsing and expanding said pairs of segments successively, said means including two rotatable disks having slots therein, a shaft slidable through said disks, and means carried by said shaft for alternately cooperating with said slots.

JOHN W. KUHN.